United States Patent
Volpe et al.

(10) Patent No.: US 10,397,362 B1
(45) Date of Patent: Aug. 27, 2019

(54) COMBINED CACHE-OVERFLOW MEMORY STRUCTURE

(71) Applicant: Amazon Technologies, Inc., Seattle, WA (US)

(72) Inventors: Thomas A. Volpe, Austin, TX (US); Kari Ann O'Brien, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 404 days.

(21) Appl. No.: 14/749,168

(22) Filed: Jun. 24, 2015

(51) Int. Cl.
*H04L 29/08* (2006.01)
*G06F 12/08* (2016.01)
*G06F 12/0891* (2016.01)

(52) U.S. Cl.
CPC ...... *H04L 67/2852* (2013.01); *G06F 12/0891* (2013.01); *G06F 2212/1041* (2013.01); *G06F 2212/154* (2013.01); *G06F 2212/281* (2013.01)

(58) Field of Classification Search
CPC ............. H04L 67/2852; G06F 12/0891; G06F 2212/1041; G06F 2212/154; G06F 2212/281
USPC ........................................................ 709/219
See application file for complete search history.

(56) References Cited

U.S. PATENT DOCUMENTS

| | | | | |
|---|---|---|---|---|
| 7,979,671 B2* | 7/2011 | Aviles | ................. | G06F 12/0813 370/395.32 |
| 8,908,693 B2* | 12/2014 | Neugebauer | ........ | H04L 45/7457 370/230 |
| 9,342,456 B2* | 5/2016 | Kobayashi | .......... | G06F 12/0866 |
| 2008/0162795 A1* | 7/2008 | Hsieh | ................. | G06F 12/0866 711/103 |
| 2011/0307683 A1* | 12/2011 | Spackman | .......... | G06F 16/1748 711/216 |
| 2013/0262767 A1* | 10/2013 | Lih | ..................... | G06F 12/0897 711/120 |
| 2016/0203082 A1* | 7/2016 | van Bemmel | ...... | G06F 12/0895 711/128 |
| 2016/0259728 A1* | 9/2016 | Eddy | ................... | G06F 12/0811 |
| 2016/0291891 A1* | 10/2016 | Cheriton | ............. | G06F 21/6218 |
| 2016/0321294 A1* | 11/2016 | Wang | ................... | G06F 16/182 |

* cited by examiner

*Primary Examiner* — Kevin T Bates
*Assistant Examiner* — Nazia Naoreen
(74) *Attorney, Agent, or Firm* — Klarquist Sparkman, LLP (57) ABSTRACT

A cache-and-overflow memory handles both cache and overflow data in a single hardware structure so as to increase speed and reduce supporting hardware structure needed to implement an effective memory system. A single hash value can be used to access either a cache data value or an overflow data value stored in the combined cache-and-overflow memory. If there are a small number of overflow entries, the combined cache-and-overflow memory provides more availability for cache entries. However, overflow entries are provided priority over cache entries. As a result, the combined cache-and-overflow memory dynamically reallocates its space to efficiently store as much as cache as possible until space is needed for overflow data. At that time, the cache data is evicted in a priority order to make space for the overflow data.

21 Claims, 8 Drawing Sheets

COMBINED CACHE-OVERFLOW MEMORY STRUCTURE

BACKGROUND

In computing, a cache is a memory component that stores data recently used so as to make faster responses for future requests of the same data. Typically, the data stored in a cache is duplicated elsewhere in the system and is the result of an earlier computation or retrieval of the data. A cache "hit" relates to data found in a cache, while a cache "miss" relates to an attempt to find data in cache, but the data is not present. When a cache hit occurs, the data can be retrieved from cache quicker than other data stores, such as a disk drive. Thus, it is well understood, that caches can speed up system accesses to data.

Overflow data is typically a separate issue from cache data and generally relates to hash collisions. Data can be stored in memory at addresses determined by hash keys. However, since practical hashing algorithms are not perfect, multiple input data sets can generate the same hash key. This means collisions can occur between selected memory locations. A bucket of multiple data entries can be placed at each hash key address. However, these buckets have a limited size and may completely fill. Thus, sometimes a hash key can point to a memory area that does not have capacity to store new data. As a result, the data is stored in a secondary memory area as overflow data.

Cache data and overflow data are stored in separate memories or a single partitioned memory. Overflow conditions can be rare, and the memory area allocated to overflows can go unused, resulting in inefficient use of memory space. Additionally, space allocated to cache data is generally static and fixed. Even if additional cache space can be more efficient, the system merely uses what is available for cache and evicts old entries to make room for new entries.

DETAILED DESCRIPTION

The cache-and-overflow memory described in this document handles both cache and overflow entries in a single hardware structure so as to increase speed and reduce supporting hardware structure needed to implement an effective memory system. A single hash key can be used to access either of a cache data value or an overflow data value stored in the combined cache-and-overflow memory. Additionally, the cache-and-overflow memory dynamically expands and contracts a number of cache entries based upon a current number of overflow entries. Thus, the combined cache-and-overflow memory dynamically reallocates its space so as to efficiently store as much cache as possible until space is needed for overflow data. If there are a small number of overflow entries, the combined cache-and-overflow memory provides more availability for cache entries. However, overflow entries are provided priority over cache entries and when additional overflow data is received, the cache entries are evicted to make space for the overflow entries. Balancing allocated space dynamically between cache entries and overflow entries allows a maximum efficiency of the available memory area. Additionally, the available memory area is shared between cache entries and overflow entries so that both entry types are intermixed in a single memory area without the need to separately partition the memory area, which can be wasteful.

In a particular implementation described herein, the hardware structure can be used for state tracking of logical network connections. For example, state can be tracked for each individual connection between two devices on a network, such as a server computer and a client computer. State tracking allows filtering of malicious spoofed packets that are correctly constructed, but not legal in a sequence of packets already in progress on that connection. Malicious packets can be used to attack a cloud service provider. Example malicious attacks can be used as a packet drop attack, a black-hole attack, a denial-of-service attack, a gray-hole attack, etc. In a particular implementation, the system can track ingress and egress packet headers and their associated state on a per-connection basis. Typically, a main memory is used to support state tracking operations by storing one entry per connection. The entries can be modified every time a valid packet is processed by the system. The connections (i.e., sessions) can be identified using header information, such as a source address, a destination address, a source port, a destination port, and a protocol type (e.g., TCP). Although a particular example is described herein for state tracking of network connections, the hardware structure can be used for other cache-overflow contexts.

Figure 1:
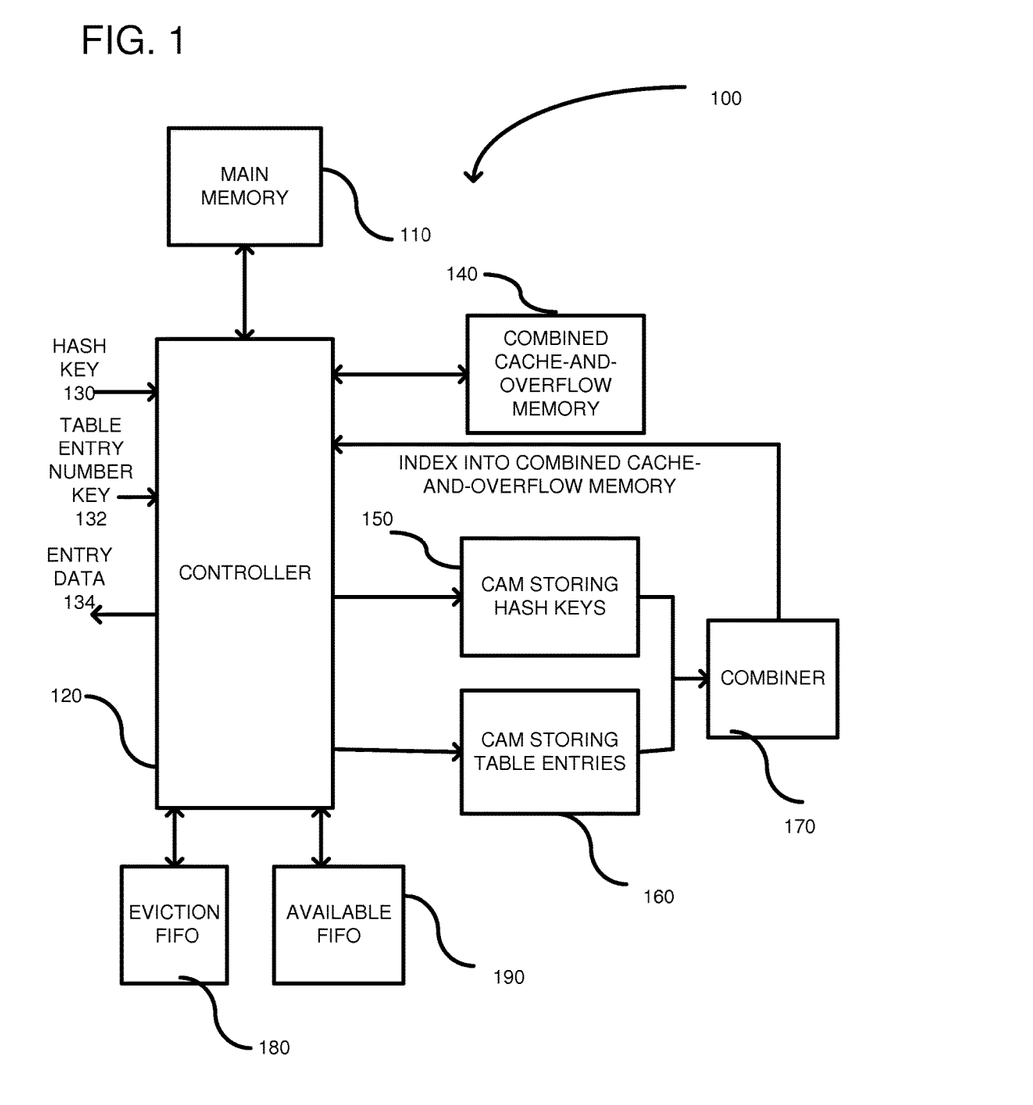
FIG. 1 shows a combined cache-and-overflow memory structure including associated hardware therewith.

FIG. 1 shows a first embodiment of a combined cache-and-overflow memory structure 100. This structure includes a main memory 110, which can be volatile or non-volatile memory. Various types of random access memory (RAM) can be used, such as DRAM, SRAM, magnetic RAM (MRAM), flash memory, etc. The main memory 110 is coupled to a controller 120 for controlling the combined cache-and-overflow memory structure 100. The controller can be implemented using any of a variety of hardware including, but not limited to, digital logic in an ASIC or SOC, a CPU, an FPGA, a microcontroller, etc. The controller 120 can receive one or more input key types used to access the main memory or a combined cache-and-overflow memory 140. For example, the illustrated keys include a hash key 130 and a table entry number key 132. As a result of receiving one of these input keys, the controller 120 can output entry data 134 (i.e., a value from an entry in one of the memories 110, 140). The combined cache-and-overflow memory 140 can be any of the memory types described above for the main memory 110 and can be indexed using one or more content-addressable memories (CAMs), such as shown at 150 and 160. The CAMs 150, 160 can receive an input key and return an address of where a matching key is stored. That returned address can be used as an index into the combined cache-and-overflow memory. Although only two CAMs 150, 160 are shown, any number of CAMs can be used. Alternatively, either of the CAMs 150, 160 can be eliminated. Although content-addressable memories (CAMs) are used for the memories 150, 160, other memory types can be substituted.

The first CAM 150 stores a plurality of hash keys that can be matched against the input hash key 130. The second CAM 160 stores a plurality of table entries that can be matched against the table entry 132. With either CAM 150, 160, an address of a matching key can be output. The address of the matching key can then be used as an index to access the combined cache-and-overflow memory 140. The outputs of the memories 150, 160 are combined in a combiner 170. A variety of hardware structures can be used as the combiner, such as a simple OR gate, multiplexer, or other hardware logic, as is well understood in the art. Additional functionality can be built into the combiner 170, such as a valid bit mask as described further below. The output of the combiner 170 is fed back into the controller 120 as an index into the combined cache-and-overflow memory 140. The controller then uses that index (as an offset) in order to access a particular entry within the combined cache-and-overflow memory 140. Once that entry is accessed according to the index, the data associated therewith can be read by the controller and output on the entry data 134 for use by other components in a system. The structure 100 can further include an eviction First-In-First-Out memory (FIFO) 180 and an available FIFO 190. Although FIFOs are shown for these components, other hardware can be used, such as shift registers or other storage elements. The eviction FIFO 180 includes an ordered list of next cache entries (addresses) within memory 140 to evict. It does not include overflow entries. Overflow entries can be evicted, but only when the network connection expires so that they are obsolete. The available FIFO 190 includes entries that are available in memory 140 for storing either overflow data or cache data. The available FIFO 190 is initialized with all combined cache-and-overflow memory entries. When a network connection ends, the associated entry in the cache-and-overflow memory is removed and the corresponding entry number is added to the available FIFO 190. The eviction FIFO 180 is initialized to be empty. When a connection state is cached in the combined cache-and-overflow memory 140, its entry number is pushed to the eviction FIFO. In this way, the oldest cache entry in the cache-and-overflow memory is what is evicted when space is needed for a new cache or overflow entry.

Figure 2:
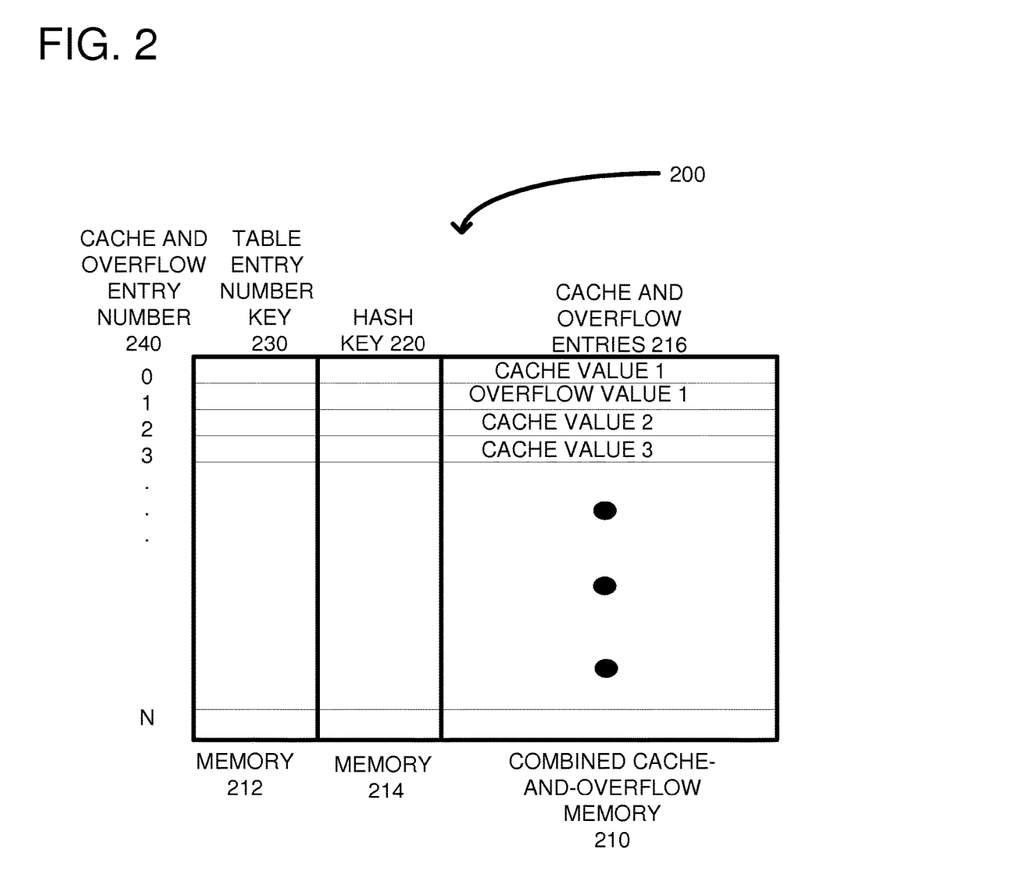
FIG. 2 shows numerous key structures for accessing data within the cache-and-overflow memory.

FIG. 2 shows an example structure 200 for storing cache and overflow values. The particular structure shows three separate memories, but other memory structures can be used. A first memory is shown as the combined cache-and-overflow memory 210, which includes cache and overflow entries 216. A second memory 214 stores hash keys 220 for matching against an input hash key. A third memory 212 stores table entry number keys 230 for matching against an input table entry number key. The second or third memory 214, 212 can be used to generate an index used to access the combined cache-and-overflow memory 210. As shown at 240, each entry in the memories 212, 214 is associated with an entry in the cache-and-overflow memory 210. The table entry number keys 230 (or other non-hash values) are typically used by a CPU (not shown) to read entries that may either be stored in main memory or may be stored in the cache-and-overflow memory 210. The hash keys 220 can be based on a variety of information, such as addresses or information related to a connection of network components. In either event, the table entry number keys 230 and the hash keys 220 are keys that provide a pointer into the combined cache-and-overflow memory 210. Any type of hash function can be used in accordance with the embodiments described herein. For example, the hash functions can be one of the following: a Jenkins hash function, a Bernstein hash function, a Pearson hash function, etc. Other types of functions can be used, such as cyclic redundancy check (CRC) functions. The desired feature of a selected function are that an input value with many bits is transformed into a smaller lookup value (with many fewer bits) and that the input values are well distributed across the range of lookup values. These features together allow the contents associated with the input values to be stored in a much smaller memory space than if the input value was used as the memory index. The memories 212 and 214 can be a variety of types of memories, such as CAMs, RAMs, DRAMs, etc. Any type of memory can be used.

The combined cache-and-overflow memory 210 can store both cache values and overflow values from a main memory. For example, index value 0 for the combined cache-and-overflow memory 210 shows a cache value 1 stored in the memory, whereas index value 1 shows an overflow value 1. Index values 2 and 3 then store cache values 2 and 3, respectively. In this way, a single key, whether it be the hash key or table entry number key, can be used to access either cache values or overflow values intermingled within the combined cache-and-overflow memory 210.

Figure 3:
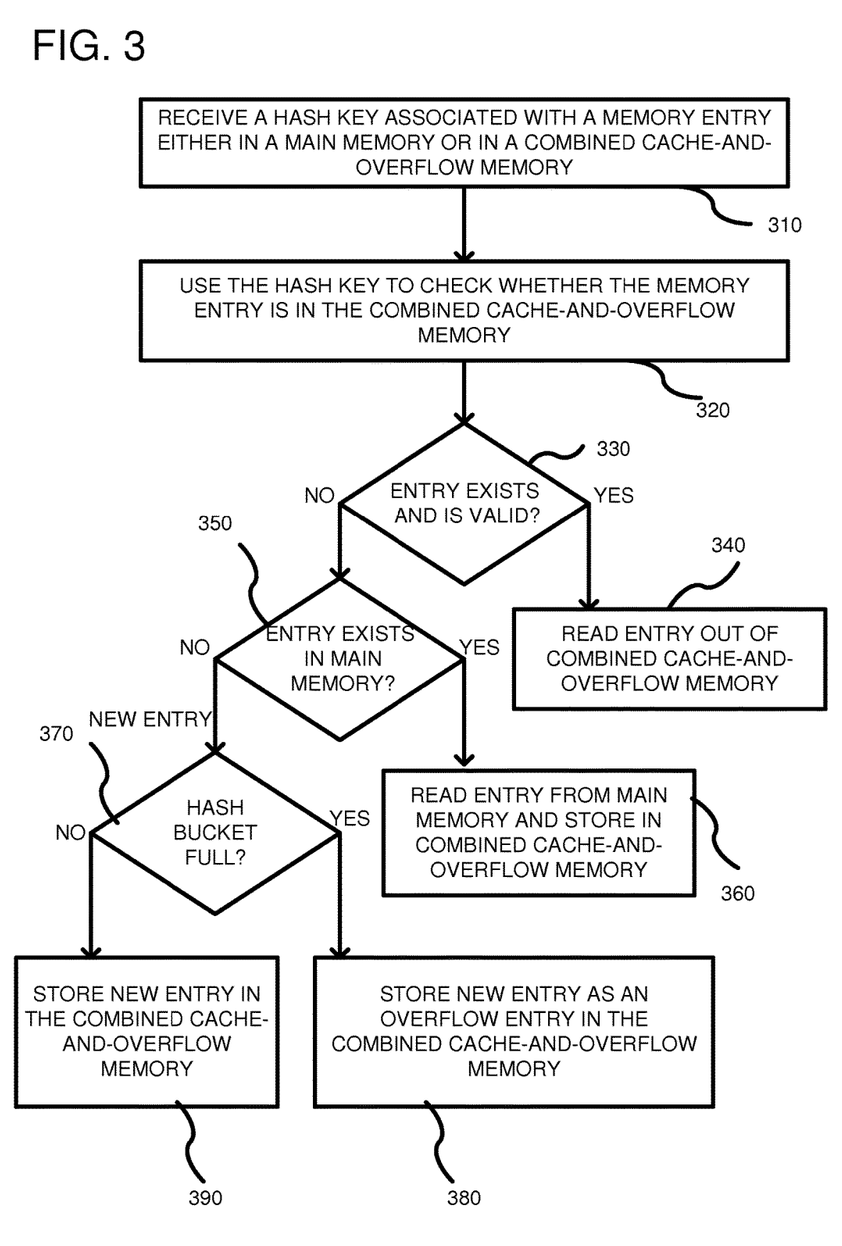
FIG. 3 shows a flow chart of a method according to one embodiment for implementing the hardware of FIG. 1.

FIG. 3 is a flow chart of a method for using the structures shown in FIGS. 1 and 2. In process block 310, a key is received that is used to check whether an associated entry is stored in either the main memory 110 or in the combined cache-and-overflow memory 140 or both. As previously described, the key can be a table entry number key 230 (FIG. 2), a hash key 220, or other type of key. Receipt of the key can be by the controller 120, as shown in FIG. 1 at either 130 or 132. In regard to the cache-and-overflow memory 140, the key can be used to identify either cache or overflow data as either is available using a same key search. In process block 320, the key is used to check whether the memory entry is in the combined cache-and-overflow memory. For example, if a hash key is received, CAM 150 can be searched to determine if a match is found on the hash key. If so, an associated memory index is transmitted to the controller 120 indicating that the memory entry is available in the cache-and-overflow memory and providing an address (or offset of an address) to use to retrieve the entry. In some embodiments, a valid bit can also be provided indicating whether the entry is still valid data. Thus, in decision block 330, the controller 120 can determine if the entry exists in the cache-and-overflow memory and is valid based on the returned value. If so, then in process block 340, the controller reads the entry out of the combined cache-and-overflow memory using the index provided. For example, the index can be an address used to access the combined cache-and-overflow memory or can be a portion of an address that is added to a base address to access in the cache-and-overflow memory.

On the contrary, if the controller determines that the entry does not exist or is not valid, then in decision block 350, the controller searches whether the entry exists in main memory. If the entry is in main memory, then in process block 360, the controller can read the entry from main memory and store the entry in the combined cache-and-overflow memory. In order to store the entry retrieved from the main memory in the cache-and-overflow memory, the controller 120 uses a next entry in the available FIFO 190 to determine where to store the data in the combined cache-and-overflow memory. If there is insufficient space within the combined cache-and-overflow memory, the controller 120 can use a next entry in an eviction FIFO 180. The index number obtained from the eviction FIFO can be used to evict a cache entry and make space for the new cache data.

If the entry is not in the main memory, then the entry is determined to be a new entry that is processed according to decision block 370 and process blocks 380 and 390. In decision block 370, a check is made to determine whether a hash bucket is full associated with the main memory. The hash key can identify a group of addresses in the main memory and, a determination can be made whether a collision condition exists. A collision means that multiple network packets hash to a same hash value. Consequently, if a collision condition occurs and the hash bucket is full, in process block 380, the new entry is stored as an overflow entry in the combined cache-and-overflow memory, without storing the new entry in the main memory. In order to know where to store the overflow entry, the controller can use the next available entry location from the FIFO 190. If no space is available for the overflow entry, then the controller 120 can obtain a cache entry to evict from the eviction FIFO 180. Overflow entries have priority over cache entries and, consequently, the cache entries are evicted in favor of the overflow entries. As a result, the number of cache entries in the combined cache-and-overflow memory is dynamically reduced and the overflow entries in the combined cache overflow memory is dynamically expanded. However, a minimum number of cache entries can be reserved to ensure that some space is available for cache entries. Returning to decision block 370, if the hash bucket is not full, then in process block 390 the new entry is stored at least in the combined cache-and-overflow memory. In some embodiments, where write through is used, the new entry can also be written to the main memory. The index where it is stored is then used to update the CAMs 150, 160 so that the entry is associated with its corresponding key for future lookups.

Figure 4:
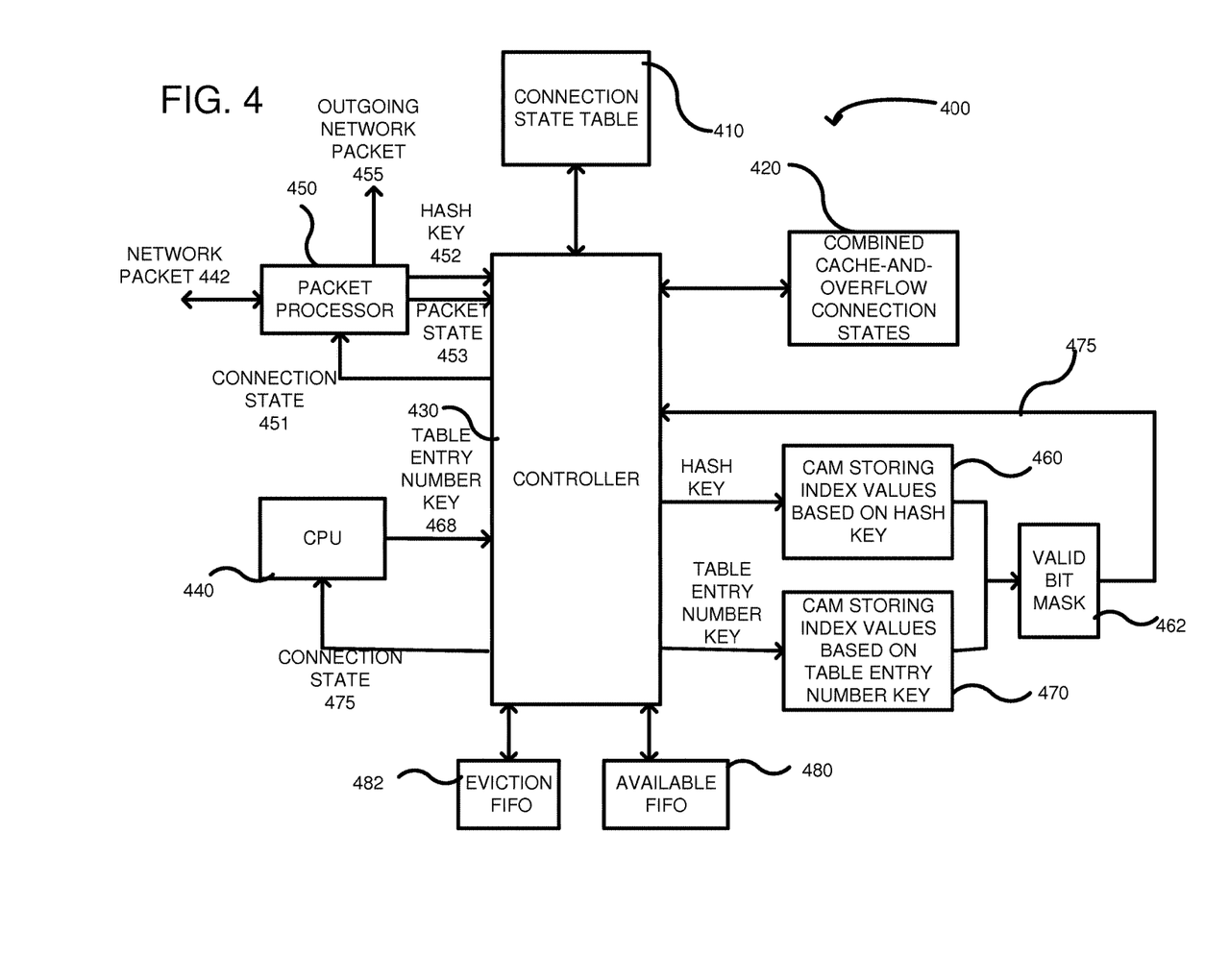
FIG. 4 shows an alternative embodiment of a combined cache-and-overflow memory used for tracking connections in a network environment.

FIG. 4 shows a particular environment in which the combined cache-and-overflow memory can be used. Specifically, a memory structure 400 is shown and includes a main memory 410 (indicated as a connection state table) and a combined cache-and-overflow memory 420 (indicated as combined cache-and-overflow connection states). In this particular embodiment, the memory structure 400 is used to track state for logical network connections. Thus, for a current network session, state information associated with that session can be stored in the connections state table 410 or in the combined cache-and-overflow connection states memory 420. A controller 430 can be used to receive information associated with a current network packet 442 and can use that information to retrieve current state information associated with the network connection. For example, in this particular embodiment, the network packet 442 is received by a packet processor 450 that can use the network packet to generate a hash key 452 to the controller 430. The packet 442 can be used to identify the network connection through use of a plurality of network packet fields extracted from the network packet. A variety of techniques can be used to identify the connection associated with the network packet 442, but a common technique is to use one or more of the following network packet fields: a source address, a destination address, a source port, a destination port, and a protocol type. Using this information, each connection can be uniquely identified. In a particular example, a hash generator can be part of the packet processor 450 and can perform a hash function on the fields extracted from the network packet so as to generate the hash key 452. Any desired hash function can be used by the packet processor, as is well understood in the art. However, typically, the packet processor inputs a larger number of bits than it generates meaning the network connection identifiers are larger than the hash key 452. In such a case, the hash key 452 does not uniquely identify every connection that can be received. Instead, the hash key 452 can result in collisions between entries in the connection state table 410, as is described below. The packet processor passes the hash key 452 to the controller 430 along with other packet state 453 in order to obtain the current connection state associated with the network packet.

The controller 430 uses the hash key 452 and the other packet state 453 to obtain a current connection state associated with the network packet 442. There are three possibilities for the controller 430 to encounter: the connection state is stored in the connection state table 410; the connection state is stored in the combined cache-and-overflow connection states 420; or the connection can be a new connection for which an entry is not yet available in either memory 410, 420. In order to determine if a connection state is associated with the received hash key 452, the controller 430 passes the hash key to the CAM 460, which stores a plurality of hash keys in association with an index into the combined cache-and-overflow memory 420. A valid bit mask hardware, shown at 462, can be used to indicate whether a cache hit or miss occurred together with the appropriate index associated with the hash key 452. In the event of a hit, the controller 430 can use the index to obtain the current connection state corresponding to the hash key in the combined cache-and-overflow memory 420. In the event of a miss, the controller can obtain the current connection state from the connection state table 410 to see if the current connection state is stored there. If the current connection state is stored either in the combined cache-and-overflow memory 420 or the connection state table in main memory 410, the controller 430 can pass the obtained connection state to the packet processor 450 as indicated at 451 for a determination whether the received network packet 442 is a malicious packet based on the connection state or a valid packet. For example, the stored connection state information in the connection state table 410 and memory 420 relates to past states for network packets of the current connection and the retrieved connection state can be used to evaluate the network packet 442 to determine whether its state corresponds to the state of this session. If the network packet is appropriate based on the current connection state of the session, the packet processor forwards the network packet as shown at 455. If the network packet is not appropriate based on the current connection state of the session, the packet processor drops the packet as it is malicious traffic.

If the controller 430 determines that the network packet 432 is a new packet because the connection state for the packet is not in the combined cache-and-overflow memory nor in the main memory 410, the controller 430 can then attempt to allocate a connection table entry in the main memory 410. If the hash bucket is not full, the allocation will be successful and the controller can store the connection state associated with the new packet as a cache entry in the memory 420. To do so, the controller 430 retrieves a next entry off of an availability FIFO 480. The availability FIFO 480 supplies a list of available addresses in the combined cache-and-overflow memory. If there are available entries within the combined cache-and-overflow memory 420, the controller writes the connection state for the new packet into the available entry in combined cache-and-overflow memory 420, updates the corresponding address in CAMs 460 and 470 such that the hash key and table entry key for network packets on this session map to the index of the connection state for the new packet stored in combined cache-and-overflow memory 420, and writes the index of the entry in memory 420 onto the end of the eviction FIFO.

If there are no available entries within the combined cache-and-overflow memory 420, the controller 430 can query an eviction FIFO 442 that provides an address for evicting an entry from the memory 420. Cache entries are evicted in the order they were added to the memory 420, so whenever a cache entry is written to the memory 420, the index of the entry is written onto the end of the eviction FIFO. When an entry is evicted from the memory 420, the controller writes the current connection state of the evicted entry from the memory 420 back to the connection state table in main memory 410, writes the connection state for the new packet into the cache entry that was evicted in memory 420, updates the corresponding address in memories 460 and 470 such that the hash key and table entry key for network packets on this session map to the index of the connection state for the new packet stored in memory 420, and writes the index of the entry in memory 420 onto the end of the eviction FIFO.

If instead, when the controller 430 attempted to allocate a connection table entry in main memory 410, the hash bucket was full, then the connection state is stored as an overflow entry in the combined cache-and-overflow memory 420. To do so, the controller 430 retrieves a next entry off of an availability FIFO 480. The availability FIFO 480 supplies a list of available addresses in the combined cache-and-overflow memory. If there are available entries within the memory 420, the controller writes the connection state for the new packet into the available entry in memory 420, and updates the corresponding address in CAMs 460 and 470 such that the hash key and table entry key for network packets on this session map to the index of the connection state for the new packet stored in memory 420. In the case of an overflow entry, the controller does not write the index of the entry in combined cache-and-overflow memory 420 onto the end of the eviction FIFO. The eviction FIFO 482 only includes cache values which already have connection state table entries allocated in the main memory 410 and does not include overflow entries, as they cannot be stored in the memory 410.

If there are no available entries within the combined cache-and-overflow memory 420 for the overflow entry, the controller 430 can query the eviction FIFO 482 that provides an address for evicting an entry from the memory 420. When an entry is evicted from the memory 420, the controller writes the current connection state of the evicted entry from the memory 420 back to the connection state table in main memory 410, writes the connection state for the new packet into the cache entry that was evicted in memory 420, and updates the corresponding address in memories 460 and 470 such that the hash key and table entry key for network packets on this session map to the index of the connection state for the new packet stored in memory 420. In the case of an overflow entry, the controller does not write the index of the entry in memory 420 onto the end of the eviction FIFO. The eviction FIFO 482 only includes cache values which already have connection state table entries allocated in the main memory 410 and does not include overflow entries, as they cannot be stored in the memory 410.

As such, any overflow entries are stored by the controller 430 in place of cache, if necessary. As such, the combined cache-and-overflow memory 420 can dynamically modify a percentage of the memory 420 dedicated to overflow and to cache. The relationship of the number of cache entries and the number of overflow entries are inversely proportional.

In another method, the CPU may want to read entries in the connection state table. However, the current connection state may either be stored in memory 420 or in the connection state table in main memory 410. In this method, the CPU 440 provides a different key than a hash key to be used for retrieving a particular state table entry. In particular, the CPU provides the table entry number key 468 to the controller 430. There are three possibilities for the controller 430 to encounter: the current connection state table entry is stored in the connection state table 410; the current connection state entry is stored in the combined cache-and-overflow connection states 420; or the connection state table entry does not contain a valid connection state in either memory 410, 420. For example, a table entry number key 468 can be sent from the CPU 440 to the controller 430. The controller then can use the table entry number key in order to probe a CAM memory 470 that stores a plurality of table entry number keys associated with an index for each key. Thus, the table entry number key 468 can be transmitted to the memory 470 so as to determine whether a current connection state associated with the key is stored in the combined cache-and-overflow connection states memory 420.

The valid bit mask hardware 462 receives the output of the memory 470 and combine the plurality of memories 460, 470 so as to indicate whether the determined index is currently valid data within memory 420. A single valid bit mask 462 can be used because each of the memories 460, 470 relate to the same connection states within the combined cache-and-overflow memory 420, but they are simply based on different input keys. Thus, in response to applying the table entry number key 468 to the memory 470, the controller can receive back whether there is a hit and an index into the memory 420 for retrieving the associated connection state. If there is a hit, the controller retrieves the connection state from memory 420, and passes the connection state back to the CPU 440 as indicated at 475. If there is a miss, the controller retrieves the connection state from the connection state table in main memory 410 and passes the connection state back to the CPU 440 as indicated at 475. Alternatively, the connection state can be requested by and returned to the packet processor, as shown at 451.

Figure 5:
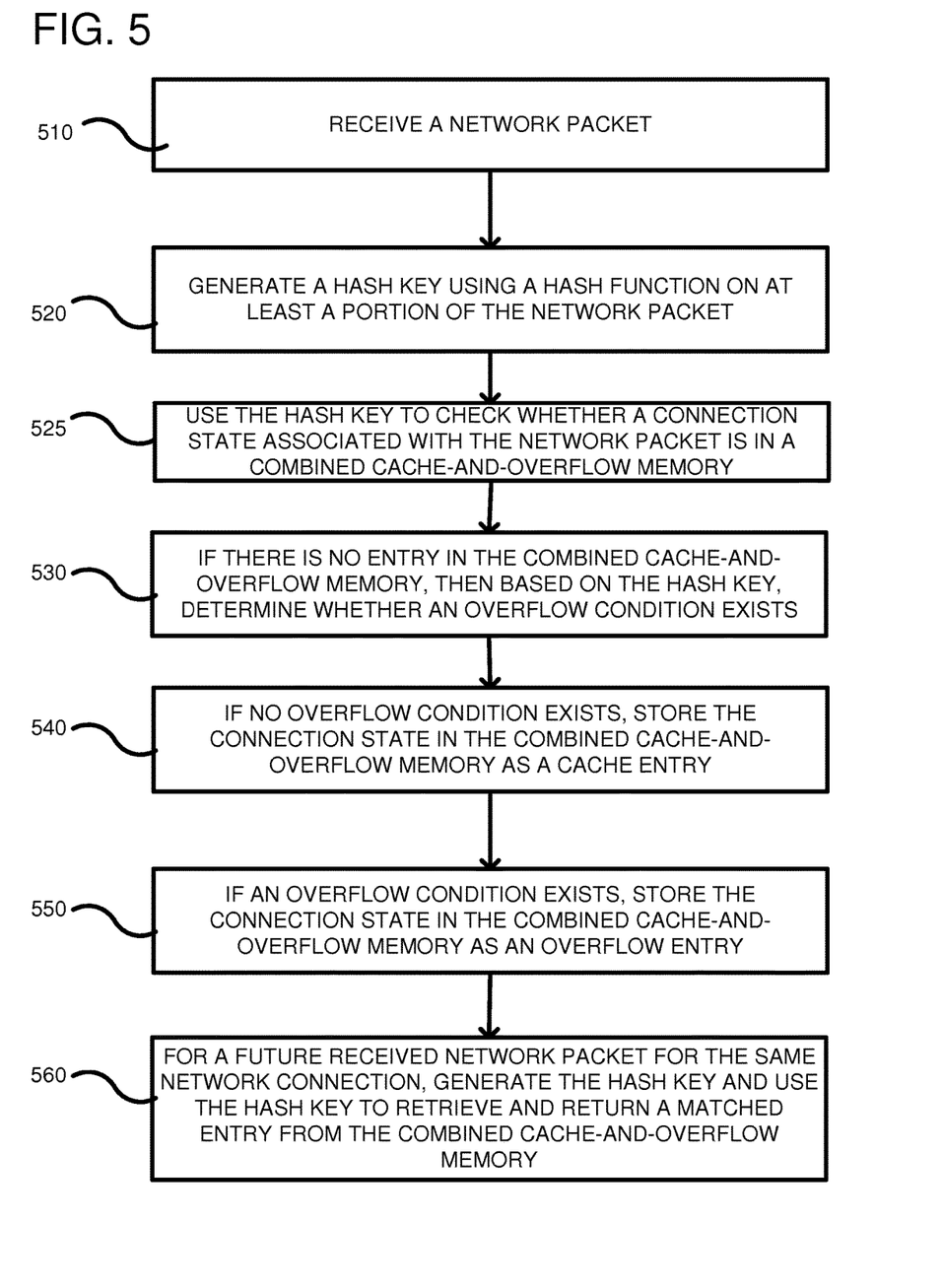
FIG. 5 shows a flow chart according to one embodiment used to implement the combined cache-and-overflow memory.

FIG. 5 is a flow chart of a method according to one embodiment for storing cache and overflow values in a memory structure, such as a memory structure shown in the previous embodiments. In process block 510 a network packet is received. The network packet can include a header and payload information. The header can include a source address, destination address, source port, destination port, protocol type and other various fields. At least some of these fields can be used to uniquely identify a network session or connection for which the network packet was received. In process block 520, a hash key is generated using a hash function on at least a portion of the network packet. For example, a hash function can be used on some of the fields within the header of the network packet. In at least one embodiment, the source address, destination address, source port, destination port and protocol type are used to uniquely identify a session so that those fields are input into the hash function in order to generate the hash key. A variety of types of hash functions can be used, such as a Jenkins hash function, a Pearson hash function, a linear hash function, etc. Other functions can also be used to convert the fields of the network packet into a unique key, such as a CRC or other techniques. In process block 525, the generated hash key can be used to check whether the entry is in the combined cache-and-overflow memory. In process block 530, if there is no entry in the combined cache-and-overflow memory, then based on the hash key, a determination is made whether an overflow condition exists. For example, a main memory can be checked for a new connection and a determination made whether there is space in the memory for the connection state information associated with the network packet or whether a collision condition has occurred and the hash bucket is full. If a collision occurs and the hash bucket is full, then a controller can indicate that an overflow condition exists. In process block 540, if no overflow condition exists, the connection state can be stored in the combined cache-and-overflow memory as a cache entry. The connection state can be stored in the combined cache-and-overflow memory by performing a cache eviction if necessary to make space for the connection state. In process block 550, if an overflow condition does exist then the connection state is stored in the combined cache-and-overflow memory as an overflow entry. Whether the connection state is stored as a cache entry or an overflow entry, a same hash key can be used to generate an index to retrieve the stored data from the cache-and-overflow memory. In some instances, the cache-and-overflow memory can be full in an overflow condition. In such a case, a cache entry can be evicted from the cache-and-overflow memory (as opposed to an overflow entry) so that overflow entries are given priority over cache entries. In process block 560, for a future network packet received for the same network connection, the hash key can be generated and used to retrieve and return a matched entry from the combined cache-and-overflow memory. If not available in the cache-and-overflow memory, then it can be retrieved from the connection state table in main memory.

Figure 6:
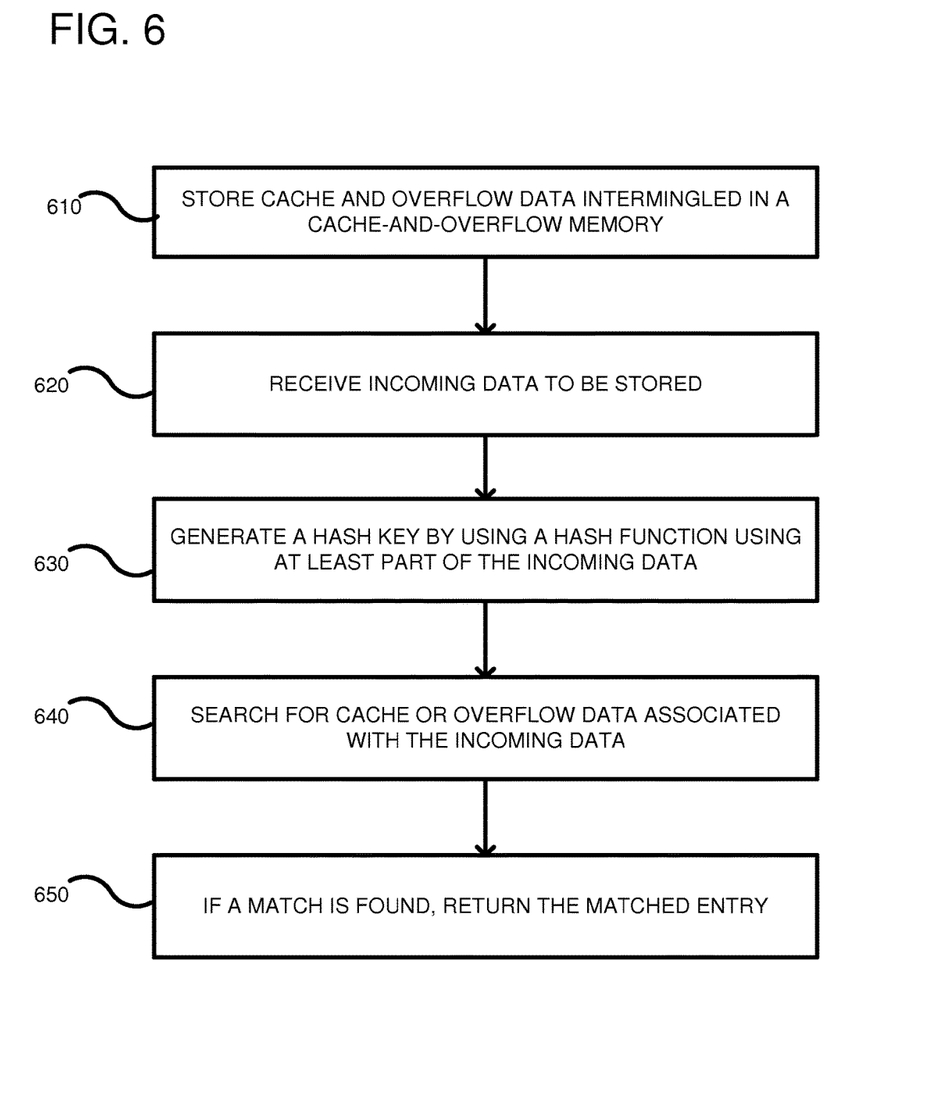
FIG. 6 shows a flow chart according to another embodiment for implementing the cache-and-overflow memory.

FIG. 6 shows a flow chart of a method according to another embodiment for storing cache and overflow values. In process block 610, cache and overflow data are stored in a cache-and-overflow memory such that they are intermingled. By intermingled it is meant that cache and overflow entries can be mixed such that an overflow entry can be positioned between two cache entries. Additionally, by being intermingled, a single key can be used to identify a location in the cache-and-overflow memory of a cache or overflow entry. In process block 620, incoming data to be stored is received. The combined cache-and-overflow memory can be used on a variety of data types. In a specific example provided herein, network packets are described as the incoming data, but other data types can be used. In process block 630, a hash key is generated using a hash function on at least part of the incoming data. As previously described, various fields of the incoming data can be used to uniquely identify the data. Such fields can be in the header, but not necessarily limited to header information, as all or part of a payload can also be used. The hash key is such that it does not uniquely identify the data. As a result, a hash collision can occur. In process block 640, cache or overflow data associated with the incoming data is searched using the hash key. For example, the hash key can be submitted as a search key in a memory containing a plurality of hash keys in order to find an index value. The index value can be used to obtain corresponding data from the cache-and-overflow memory. In process block 650, if a match is found, the matched entry is transmitted for use by other components in the system.

Figure 7:
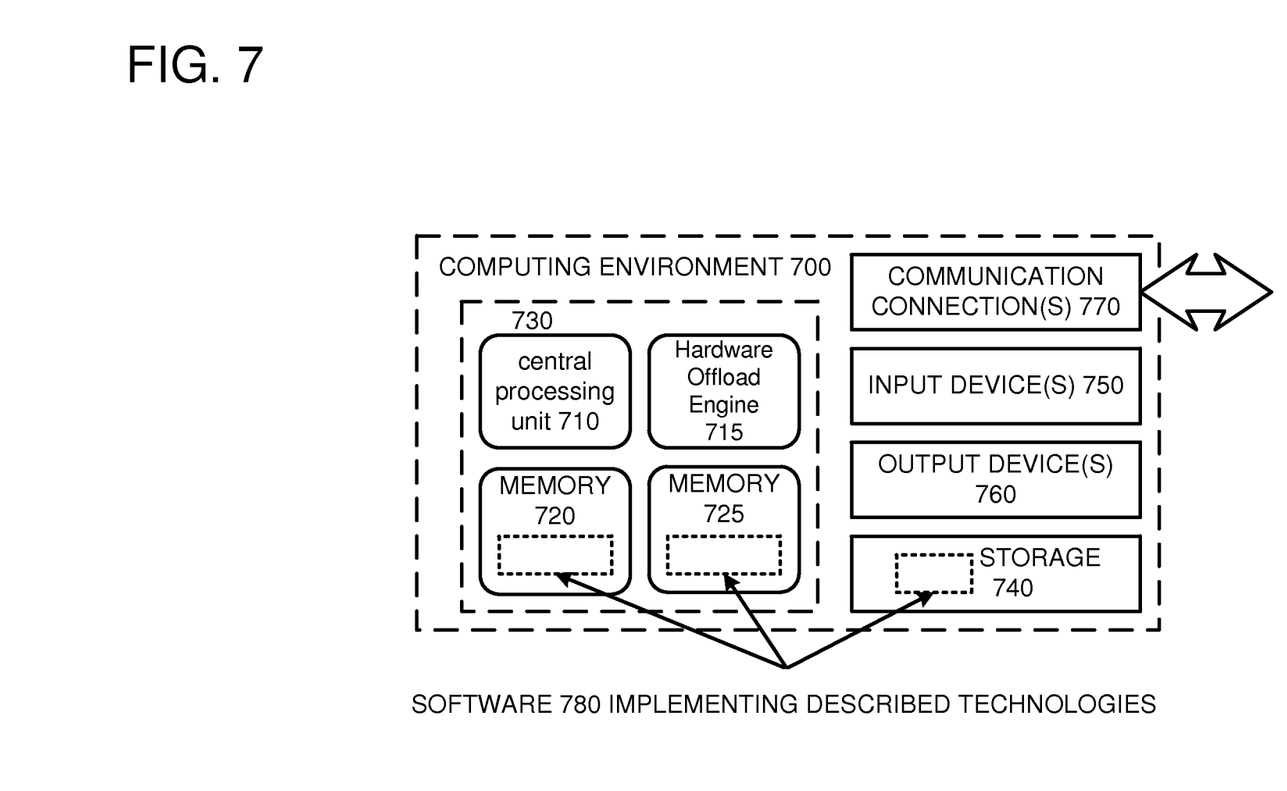
FIG. 7 depicts a generalized example of a suitable computing environment in which the described innovations may be implemented.

FIG. 7 depicts a generalized example of a suitable computing environment 700 in which the described innovations may be implemented. The computing environment 700 is not intended to suggest any limitation as to scope of use or functionality, as the innovations may be implemented in diverse general-purpose or special-purpose computing systems. For example, the computing environment 700 can be any of a variety of computing devices. For example, the computing environment can be the controller or CPU described herein or can contain the controller or CPU. Alternatively, some of the hardware structures described herein can include or be implemented in software, which can be executed in the computing environment 700.

With reference to FIG. 7, the computing environment 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing environment 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Figure 8:
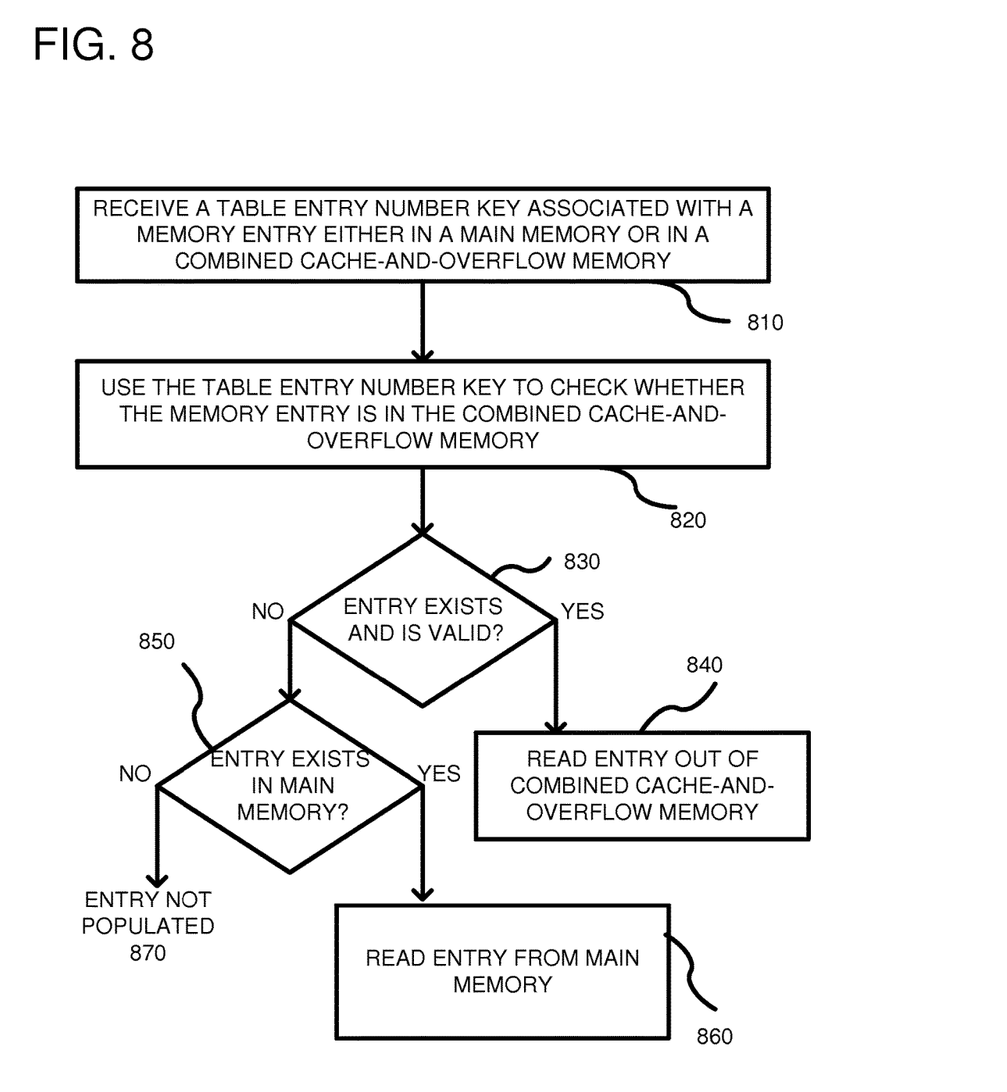
FIG. 8 shows a flowchart of a method according to one embodiment for using a table entry number key to read a connection state associated with a network packet.

FIG. 8 is a flowchart of a method for reading the current state of a connection state table entry using the entry number of the entry in main memory. The connection state table entry can be in one of three conditions: the entry in main memory is invalid, the entry in main memory is valid and contains the current connection state, or the entry in main memory is valid but the current state is contained in the combined cache-and-overflow memory. In addition, the connection state that overflowed the connection state table entries in main memory must be read directly from the combined overflow-and-cache memory. In process block 810, when a connection state table entry is to be read, a table entry number key is received from the CPU that is associated with a connection state table entry in main memory. In one example, as shown in FIG. 1, the table entry number key 132 can be received by the controller 120. In process block 820, the table entry number key is used to check whether the current connection state associated with that connection state table entry is in the combined cache-and-overflow memory. In decision block 830, a determination is made whether the current connection state is cached in the combined cache-and-overflow memory (whether it exists and is valid). If so, then in process block 840, the current connection state is read out of the combined cache-and-overflow memory. If not, then in process block 850, a determination is made whether the current connection state exists and is valid in main memory. If so, then in process block 860, the current connection state is read from main memory. Otherwise, the connection state table entry is not populated (not valid) as indicated at 870. Using this method, the CPU 440 can read through all the connection state table entries by entry number and retrieve the current state of all entries regardless of whether they are stored in the combined cache-and-overflow memory or in main memory.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method of storing cache and overflow values, the method comprising:
receiving a network packet over a network connection;
generating a hash key using a hash function on at least a portion of the network packet;
using the hash key to check whether a connection state associated with the network packet is in a combined cache-and-overflow memory;
based on at least the hash key, determining whether an overflow condition exists for storing the connection state in a main memory, wherein an overflow condition exists when a hash collision occurs;
if no overflow condition exists, storing the connection state in a combined cache-and-overflow memory as a cache entry, wherein the combined cache-and-overflow memory includes intermingled cache entries and overflow entries;

if an overflow condition exists, determining whether the combined cache-and-overflow memory is full;

if the overflow condition exists, for storing the connection state in the main memory, and the combined cache-and-overflow memory is not full, storing the connection state in the combined cache-and-overflow memory as an overflow entry;

if the overflow condition exists and the combined cache-and-overflow memory is full, evicting a cache entry and storing the connection state in the combined cache-and-overflow memory as an overflow entry in a location where the cache entry was evicted so as to give priority to overflow entries over cache entries in the combined cache-and-overflow memory; and for a future network packet received over the network connection, generating the hash key using at least a portion of the future network packet and using the hash key to retrieve the connection state from the combined cache-and-overflow memory.

2. The method of claim 1, wherein the hash key identifies a group of addresses in the main memory.

3. The method of claim 1, wherein the portion of the network packet used to generate the hash key includes a source address, a destination address, a source port, a destination port, or a protocol type.

4. The method of claim 1, wherein storing the connection state in the combined cache-and-overflow memory includes accessing a first-in-first-out (FIFO) data storage for an available location in the combined cache-and-overflow memory.

5. A computer-readable storage medium including instructions that upon execution cause a computer system to:

store cache and overflow data intermingled in a cache-and-overflow memory and give priority to overflow data over cache data when evicting an entry from the cache-and-overflow memory by evicting a cache entry after determining that the cache-and-overflow memory is full, wherein overflow data relates to a hash collision for entries to be stored in a main memory;

receive incoming data to be stored;

generate a hash key by using a hash function on at least part of the incoming data;

using the generated hash key, search the cache-and-overflow memory for cache or overflow data associated with the incoming data; and transmit a matched entry of cache or overflow data from the cache-and-overflow memory.

6. The computer-readable storage medium of claim 5, wherein the search is a first search, the storage medium further including instructions that upon execution cause the computer system to:

if the match is not found as a result of the first search, perform a second search using the hash key to determine if data is stored in a main memory that is associated with the incoming data, and, if a match is found for an entry in the main memory during the second search, store the incoming data in the entry of the main memory and in the cache-and-overflow memory.

7. The computer-readable storage medium of claim 6, wherein storing the incoming data in the cache-and-overflow memory includes identifying an available location in the cache-and-overflow memory using a first-in-first-out (FIFO) data storage that includes available locations within the cache-and-overflow memory.

8. The computer-readable storage medium of claim 6, further including instructions that upon execution cause the computer system to:

if the match is not found as a result of the second search, determine if the main memory has an available location to store the incoming data in association with the hash key and, if not, store the incoming data in the cache-and-overflow memory as overflow data, such that the incoming data is not stored in the main memory.

9. The computer-readable storage medium of claim 8, wherein storing the incoming data in the cache-and-overflow memory as the overflow data includes identifying a location where cache data is stored in the cache-and-overflow memory and evicting the cache data so that the overflow data can be stored in the identified location.

10. The computer-readable storage medium of claim 9, wherein the identifying of the location where the cache data is stored includes accessing an eviction first-in-first-out (FIFO) data storage including an ordered list of addresses to evict.

11. The computer-readable storage medium of claim 5, wherein the received incoming data is a network packet and cache or overflow data associated with the incoming data includes cache or overflow data associated with a same network session.

12. The computer-readable storage medium of claim 11, wherein generating the hash key includes using the hash function on at least a source address, a destination address, a source port, a destination port, or a protocol type of the network packet.

13. The computer-readable storage medium of claim 5, further including retrieving an index into the cache-and-overflow memory through a first content addressable memory (CAM) using the hash key or a second CAM using a table entry number key.

14. The computer-readable storage medium of claim 13, wherein both the first CAM and the second CAM are coupled to a bit mask to identify whether there is a cache or overflow hit or miss.

15. The computer-readable storage medium of claim 5, wherein the incoming data is a first incoming data and the hash key is a first hash key, the storage medium further including instructions that upon execution cause the computer system to receive a second incoming data to be stored, generate a second hash key by using the hash function on at least part of the second incoming data, retrieve the first incoming data from the cache-and-overflow memory using the second hash key, and use state information from the first incoming data to determine if the second incoming data is malicious.

16. A hardware memory structure for storing both cache and overflow data, comprising:

a first memory acting as a main memory for storing data values;

a second memory acting as a combined cache-and-overflow memory for the main memory, wherein the cache data is a copy of data in the main memory and overflow data is data that is not stored in the main memory due to hash collisions in the main memory and due to a hash bucket associated with the hash collision being full, the combined cache-and-overflow memory including intermingled of the cache data and the overflow data;

a controller coupled to the first memory and the second memory, the controller configured to receive an input value and to determine to store the input value in the first memory and the second memory as cache data, or in only the second memory as overflow data, wherein the second memory includes intermingled cache data and overflow data, wherein the overflow data is given priority over the cache data with respect to evictions from the second memory.

17. The hardware memory structure of claim 16, wherein a hash key can be used to access either cache data or overflow data in the second memory.

18. The hardware memory structure of claim 16, further including a third memory coupled to the controller that outputs indexes into the second memory based on a hash key.

19. The hardware memory structure of claim 18, further including a fourth memory coupled to the controller that outputs the indexes into the second memory based on a table entry number key, the fourth memory output and the third memory output both coupled to a valid bit mask.

20. The memory structure of claim 16, further including an eviction first-in-first-out (FIFO) memory coupled to the controller that stores a list of cache entries in the second memory to evict.

21. The memory structure of claim 16, further including an available first-in-first-out (FIFO) memory coupled to the controller that stores a list of available locations in the second memory.

* * * * *